(12) United States Patent
Scheerer et al.

(10) Patent No.: US 7,783,667 B2
(45) Date of Patent: Aug. 24, 2010

(54) KEY MANAGEMENT AND HIGH PERFORMANCE RUNTIME FOR VIEW BUSINESS OBJECTS

(75) Inventors: Oliver Scheerer, Nussloch (DE); Uwe E. Fischer, Karlsruhe (DE)

(73) Assignee: SAP AG, Walldorf (DE)

( * ) Notice: Subject to any disclaimer, the term of this patent is extended or adjusted under 35 U.S.C. 154(b) by 333 days.

(21) Appl. No.: 11/940,212

(22) Filed: Nov. 14, 2007

(65) Prior Publication Data

US 2009/0125531 A1 May 14, 2009

(51) Int. Cl.
*G06F 17/30* (2006.01)

(52) U.S. Cl. .................. 707/791; 707/601; 707/602; 707/608; 707/802; 707/828

(58) Field of Classification Search .......... 707/600–831
See application file for complete search history.

(56) References Cited

U.S. PATENT DOCUMENTS

2002/0174130 A1* 11/2002 Wagner ................... 707/102

\* cited by examiner

*Primary Examiner*—Isaac M Woo
(74) *Attorney, Agent, or Firm*—Mintz, Levin, Cohn, Ferris, Glovsky & Popeo, PC (57) ABSTRACT

The subject matter disclosed herein provides methods and apparatus, including computer program products, for determining keys for use with data structures, such as objects, business objects, view business objects, and the like. In one aspect, there is provided a computer-implemented method. The method may include determining a first key of a view business object node by combining one or more keys of the business object nodes used to form the view business object node, the first key used to identify the view business object node when the view business object node is a root node. The method may also include determining, when the view business object node has a parent node, a second key of the view business object node by combining the first key and at least one key of the parent node, the second key used to identify the view business object node. Next, the method may store at least one of the first key and the second key to identify the view business object node during a query or a retrieve operation associated with a database. Related apparatus, systems, methods, and articles are also described.

18 Claims, 5 Drawing Sheets

KEY MANAGEMENT AND HIGH PERFORMANCE RUNTIME FOR VIEW BUSINESS OBJECTS

FIELD

The present disclosure generally relates to key management.

BACKGROUND

In a client-server architecture, a client system, such as a computer, may call an application, such as a program, a service, or a web service, at a server to interact with the application through the Internet or an intranet. A service, such as a web service, is an application (or program) that may make itself available over the Internet or an intranet, may use standardized messaging, such as XML (eXtensible Markup Language) and Simple Object Access Protocol (SOAP), and may use some type of location mechanism, such as UDDI (Universal Description, Discovery, and Integration), to locate the service and its public Application Program Interface (API).

To call a service through the Internet or intranet, the client system makes a call (e.g., using messages) through an API, which defines the way the client communicates with the service. The service instantiates objects, such as business objects, in response to the API call. The term "object" refers to a data structure including at least one of data and related methods, while the phrase "business object" refers to an object used in connection with a business process or a task.

An example of a service is a "flight reservation" service, which may be called through a network (e.g., the Internet and/or the intranet) by a client system. The flight reservation service may allow a user at a client system to perform a variety of flight reservation tasks, such as display, save (i.e., make), and edit (i.e., modify) reservations. The data and method associated with the service may be structured and instantiated as one or more objects, such as business objects.

SUMMARY

The subject matter disclosed herein provides methods and apparatus, including computer program products, for determining keys for use with data structures, such as objects, business objects, view business objects, and the like. In one aspect, there is provided a computer-implemented method. The method may include determining a first key of a view business object node by combining one or more keys of the business object nodes used to form the view business object node, the first key used to identify the view business object node when the view business object node is a root node. The method may also include determining, when the view business object node has a parent node, a second key of the view business object node by combining the first key and at least one key of the parent node, the second key used to identify the view business object node. Next, the method may store at least one of the first key and the second key to identify the view business object node during a query or a retrieve operation associated with a database.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

In the drawings.

Like labels are used to refer to same or similar items in the drawings.

DETAILED DESCRIPTION

Figure 1:
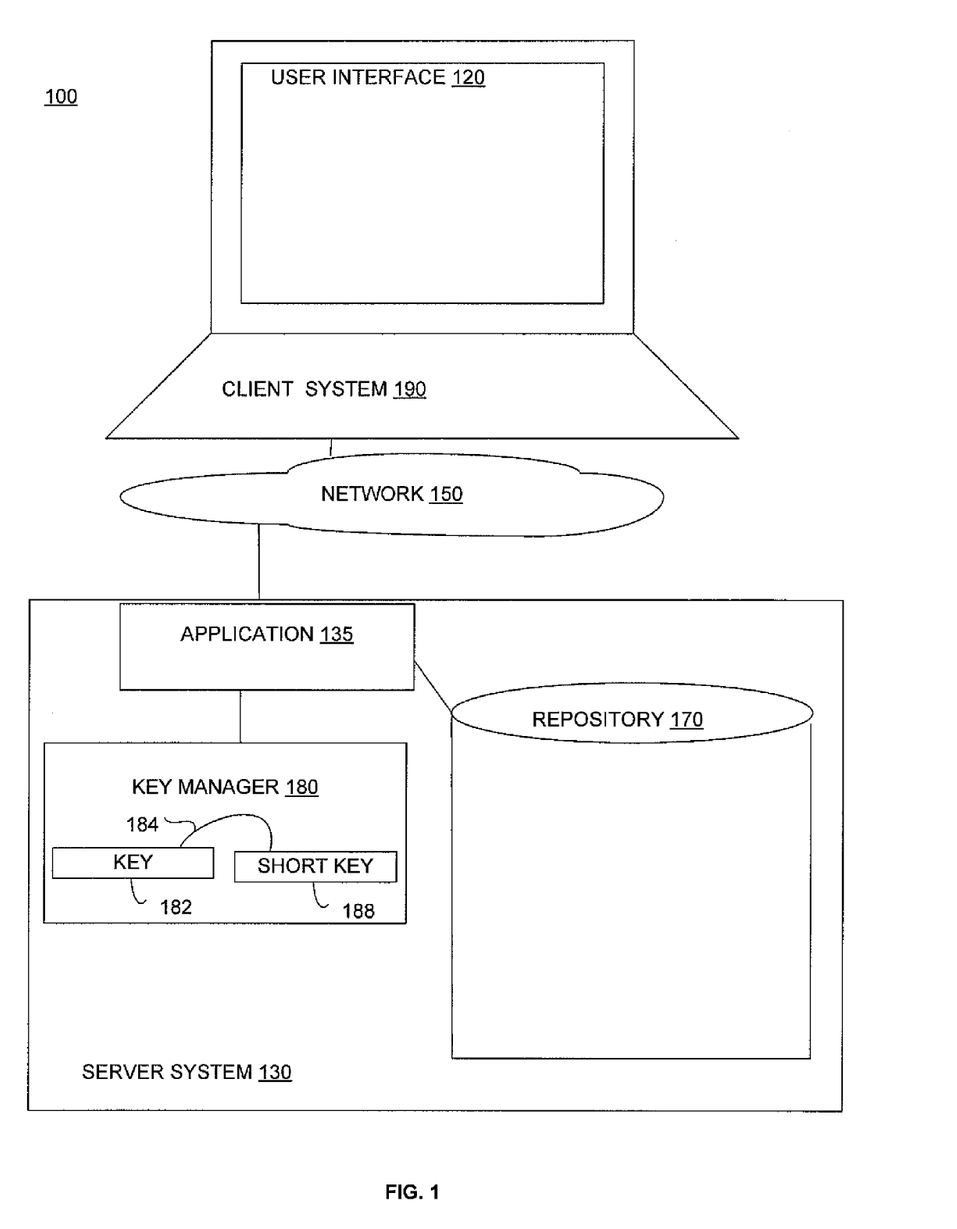
FIG. 1 depicts a system for a key manager.

FIG. 1 depicts an exemplary system 100 for deriving a key for view business objects nodes and using the determined key in an enhanced runtime environment. The system 100 includes a client system 190 coupled to a server system 130 through a network 150 (e.g., the Internet, an intranet, or any other communication mechanism). The client system 190 and server system 130 may be implemented as a processor, such as a computer, server, and the like.

The client system 190 further includes one or more applications, such as a user interface 120. The user interface 120 may be any application used to interface with other applications, such as programs, services, web services, and the like. For example, the user interface 120 may include a browser or a client application to interface with (and/or access) an application, such as application 135 at server 130.

Application 135 may be implemented as any application, such as a service, a web service, and the like. For example, application 135 may execute one or more business processes associated with a flight reservation service (or web service). When client system 190 calls application 135, business objects and view business objects may be instantiated by application 135. The business objects and view business object may thus serve as the so-called "building blocks" for application 135, enabling it to execute its designated business processes.

The server system 130 also includes a repository 170 including business objects, which may have templates or types ("business object types"), so that each business object type describes an aspect of a business process. For example, a business object type may describe (or relate to) aspects of a business process, such as products, suppliers, business partners, flight information, and the like. A business object, on the other hand, is an instance of one of the business object types providing the data necessary to execute a business process.

In the Enterprise Service Architecture (ESA) available from SAP AG, a business object includes one or more business object nodes. Each business object includes a single root node. A root node is a node that does not have a parent node and may have one or more child nodes. A node may include data, such as attributes (e.g., fields). The attributes of a node may be arranged in a hierarchical structure. The nodes are associated to each other by a hierarchical set of relationships. In addition, there may be other relationships between the nodes of a business object. Moreover, there may be relationships between business object nodes belonging to different business objects (e.g., cross business object associations).

Different business processes may use different data. One way to handle the use of different data is to have each business process be the so-called "owner" of the business object types and corresponding business objects to provide the data needed for a particular process. However, if the data to be used by different business processes is similar, such an ownership approach may lead to an inefficiently large number of business object types stored for each business process. To avoid such inefficiency, a so-called "view business object type" may be used.

A "view business object type" refers to a special kind of a business object type. The view business object type is similar to a business object type in many respects. A view business object type may have the same, or similar, structure to a business object type. For example, the view business object type may include nodes, relationships, and attributes. However, the relationships between nodes may be considered "virtual" since the view business object type represents a transformation of another, source business object type (or a plurality of source business object types) used to form the view business object type. The transformation describes how the data provided by a view business object type is related to the data provided by the other, source business object type. A view business object type is thus generated by a transformation of the actual data provided by the source business object type into a form needed by the view business object type to satisfy another business process. The transformation may be performed in a variety of ways including using a join or a projection, as described further below. The use of a view business object type enables reuse of business object types in many processes—minimizing thus the total number of business object types.

As noted above, a view business object type is similar to a business object type. For example, one or more of the nodes of the view business object type may be a projection of the source business object type. A projection uses the original business object and reduces the nodes and the attributes of a node to a subset. For example, given a business object node "flight" having attributes, such as departure time, arrival time, and number of available seats, a business process may be responsible for searching flights with available seats. A view business object node may be created to view flights with only the attribute "number of available seats." In other words, the projection uses the original source business object (e.g., "flight") to reduce (or remove) any nodes and/or attributes of nodes that are not needed or are not of interest. Each attribute in a node of a view business object may also be mapped to an attribute in a node of the source business object.

A node of a view business object type may also be determined by joining one or more nodes of business object types. A join refers to combining nodes (e.g., two tables of a database or two records from two tables of a database) to form a new (often temporary) table referred to as a joined table. The relationships between business object nodes (e.g., inner business object relationships, cross business object relationships as well as freestyle join conditions relating to attributes of the joined nodes) may be used for joining. A freestyle join may be performed as follows: First, a business object developer creates a business object type "flight." In this example, the business object type is a single root node with attributes, such as flight number, departure time, arrival time, number of available seats. Next, the business object type "reservation" is created. The business object type in this case is a single root node with attributes, reservation number, seat number, and flight number. Next, an association between the "flight" root node and the "reservation" root node is created using "flight number" as the join condition. Next, the view business object developer executes a creation of a view business object type including a single root node. The view business object root node holds attributes, such as departure time, seat number, and flight number. For creation of this view business object type, flight must be joined with reservation. For joining, the above-described association "flight number" may be used. When an association is not defined as described above, then a developer of the view business object may be prompted to define the view business object by maintaining the join condition (flight-flight_number=reservation-flight_number). This latter case is referred to as a "freestyle join condition." When joined, each attribute of the view business object node is mapped to an attribute of a business object node involved in the join.

View business object nodes are related to each other by so-called "virtual relationships." The virtual relationships may also be mapped to the relationships between the source business object nodes. Alternatively, a virtual relationship may be mapped to a freestyle foreign key relationship between business object nodes.

Nodes of business objects are identified by a unique key. A key refers to a value, such as a number, character, or other similar identifier. A unique key is also needed to identify view business object nodes. The subject matter described herein relates to deriving a unique key for a node of a view business object.

The server system 130 further includes key manager 180. The key manager 180 may be used to determine a key for the view business object nodes. The key manager 180 may be implemented as a program or component, i.e., a small binary object (e.g., an applet) or program that performs a specific function and is designed in such a way to operate easily with other components and applications, such as a service, web service, and/or user interface 120. In some implementations, key manager 180 is implemented as a service (e.g., as part of SAP's Enterprise Services Framework) or web service accessible by other applications through an intranet and/or the Internet.

Figure 2:
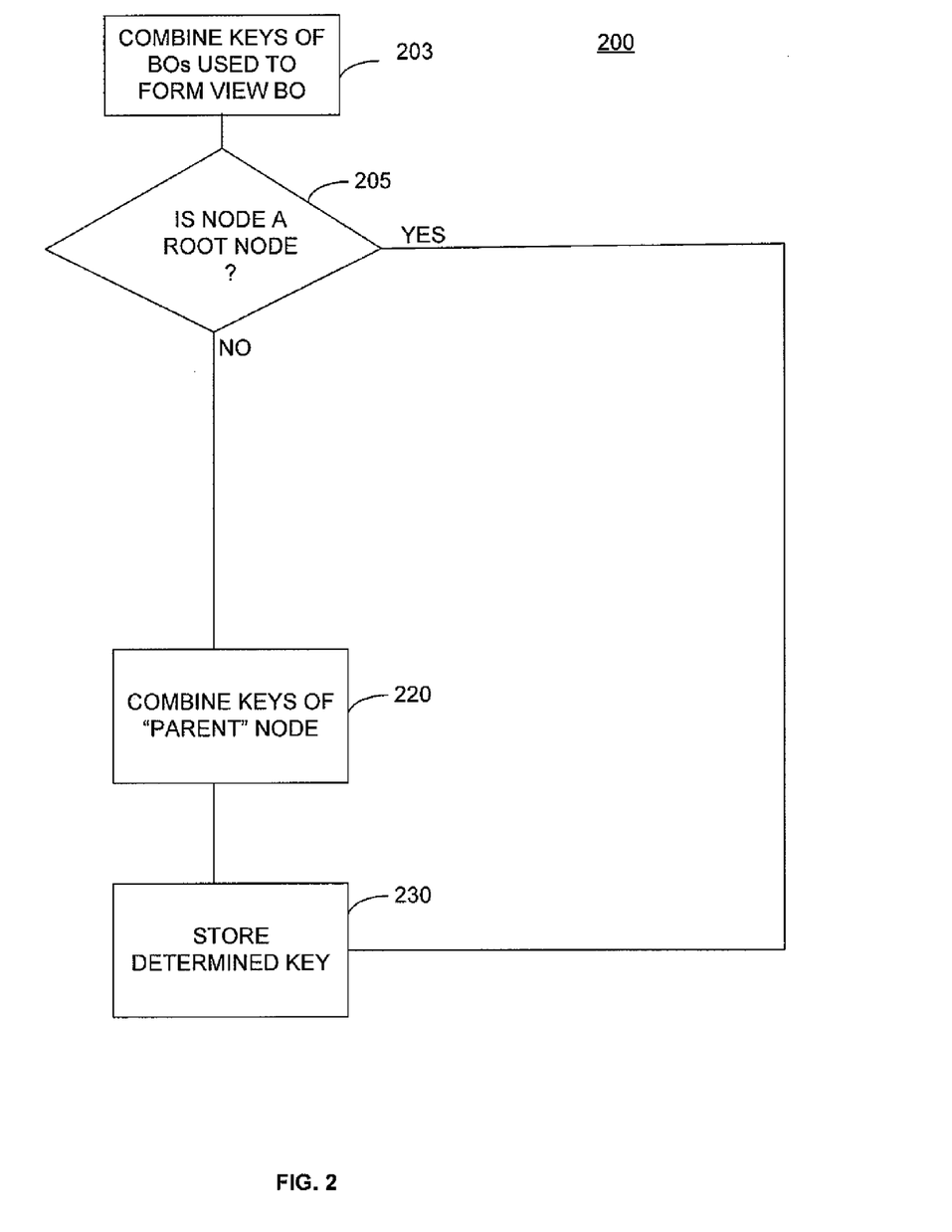
FIG. 2 is a process flow for determining keys for view business object nodes.

FIG. 2 depicts a process flow 200 for determining keys for view business objects. At 203, key manager 180 determines the key for the node by combining the keys of the business object nodes used to form the view business object.

At 205, key manager 180 may determine whether a node of a view business object is a root node. To determine whether a node is a root node, key manager 180 may use relationship information as well as metadata associated with the node of the view business object node.

When the view business object node is not a root node, at 220, key manager 180 may also include one or more keys of at least one parent node of the view business object node. For example, when the view business object node has one parent view business object node, the key of the parent view business object node is combined with the key of 203. The key of the parent view business object node may also be determined by the process 200 of FIG. 2.

At 230, key manager 180 stores any keys determined at 203 and 220 to uniquely identify the view business object node.

Figure 3:
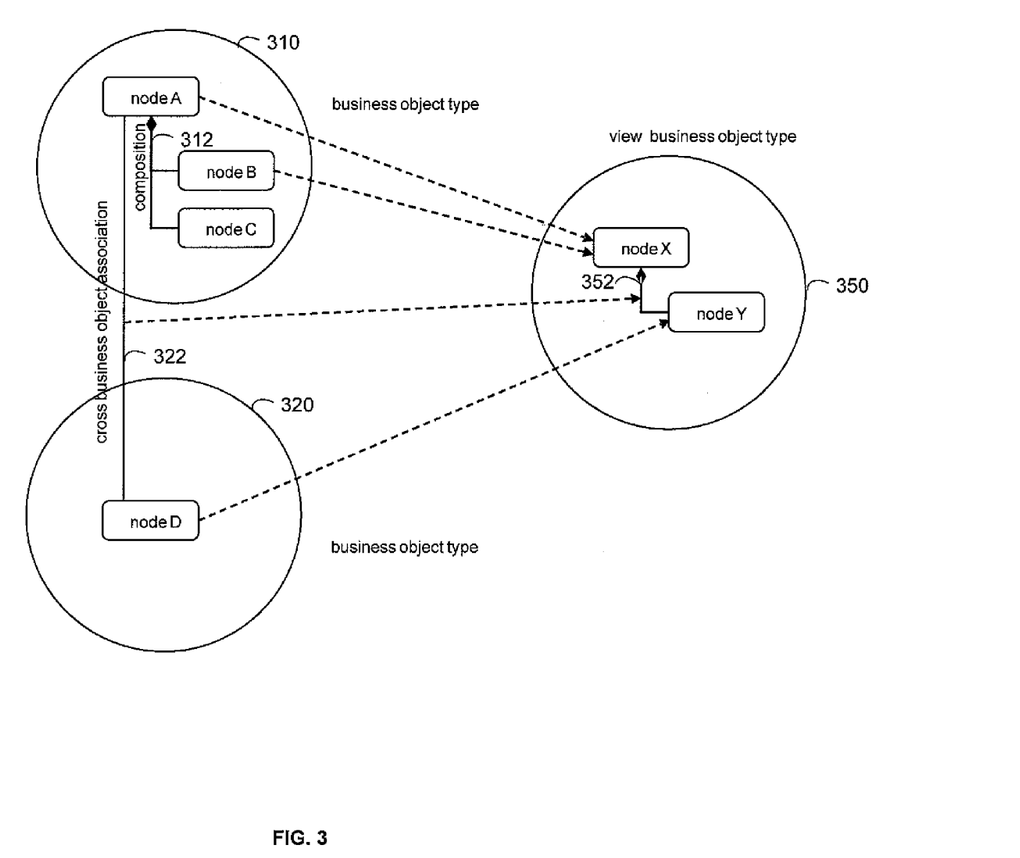
FIG. 3 depicts examples of nodes of business object types and view business object nodes.

FIG. 3 depicts examples of business object types and a view business object type. Referring to FIG. 3, business object type one 310 includes node A (a root node), node B, and node C with an association (also referred to as a link or a composition). Business object type two 320 includes node D with a so-called cross business object association 322 to business object type one 310. View business object type 350 includes nodes X and Y, with node X serving as a root node X. Nodes X and Y are associated by a virtual association (or composition). Node X is a transformation of source nodes A and B. In particular, node X is transformed by joining source node A and node B using the association 312 between node A and node B. Node Y is a transformation of Node D. In particular, node Y is a projection of node D. The association 352 (representing a composition relationship) between node X and node Y is virtual since it is mapped to the cross business object association 322 between A and D.

Figure 4:
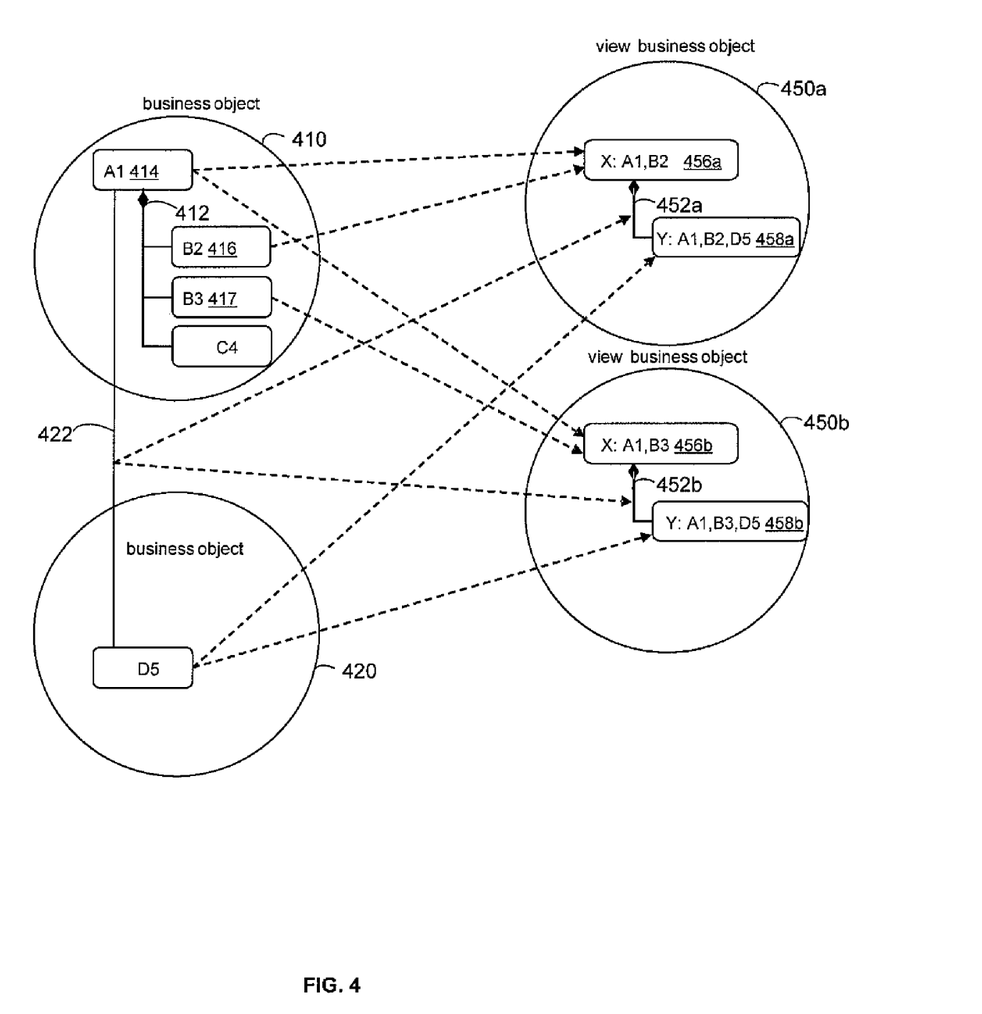
FIG. 4 depicts instances of the nodes of business object types and view business object nodes of FIG. 3.

FIG. 4 depicts view business objects instantiated from the business object types of FIG. 3. Referring to FIG. 4, business object 410 includes a root node A1 with an association 412 to nodes B2, B3, and C4. Business object 420 includes node D5 with a so-called cross business object association 422 to business object 410. View business object 450a includes two nodes X and Y, with node X serving as a root node. View business object 450b includes two nodes X and Y, with node X serving as a root node. Since business object 410 has two B subnodes (with keys B2, B3), there are two view business objects 450a and b with root nodes originating from the join of nodes A1, B2 and nodes A1, B3. Key manager 180 may determine the keys for the nodes of view business objects 450a and b based on the process 200 of FIG. 2.

At 203, key manager 180 forms a key by combining the keys of the business object 410 used to form the view business object 450a. In this case, node X 456a has a key of A1 and B2 (corresponding to the keys A1 and B2 of node A 414 and node B 416). At 205, key manager 180 determines that node X 456a is a root node. When that is the case, at 230, the key manager 180 stores the determined key so that it can be used to uniquely identify the view business object node 456a.

To determine the keys for node X 456b, at 203, key manager 180 forms a key by combining the keys A1 and B3 of node A 414 and node B 417. At 205, key manager 180 determines that node X 456b is a root node. When that is the case, at 230, the key manager 180 stores the determined key so that it can be used to uniquely identify the view business object node 456b.

To determine the key for node Y 458a, at 203, key manager 180 forms a key for node 458a by combining the keys of the business object used to form the view business object, which in this example is the key D5. At 205, key manager 180 determines that node Y 458a is not a root node. When this is the case, at 220, key manager 180 also includes the keys A1, B2 of the view business object parent node, which in this case is node 456a. At 230, key manager 180 stores the determined key of node Y 458a as A1, B2, D5, so that it can be used to uniquely identify the view business object node 458a.

To determine the key for node Y 458b, at 203, key manager 180 forms a key for node 458b by combining the keys of the business object used to form the view business object, which in this example is the key D5. At 205, key manager 180 determines that it is not a root node. When this is the case, at 220, key manager 180 also includes the keys A1, B3 of the view business object parent node 456b. At 230, key manager 180 stores the determined key of node Y 458b as A1, B3, D5, so that it can be used to uniquely identify the view business object node 458b.

In some implementations, the use of the process 200 provides the advantage of enabling unique keys to be determined even when view business object nodes are determined from the same business object node, as in the case above with node D5.

In some implementations, the determined keys of view business object nodes, formed by combining other node keys, may result in a key which may be considered too long and inconsistent with syntactical requirements (e.g., field length). When this is the case, a shortened key (i.e., meeting syntactical requirements) for view business object nodes may be used. When a shortened key is used, key manager 180 maps the shortened key to the longer key (i.e., the determined key).

FIG. 1 depicts a determined key 182 mapped 184 (e.g., link, identifier, or the like) to a short key 188 for the view business object node (e.g., nodes 456a and 458a). The shortened key 188 may be created using any approach that may provide a unique number, such as by using a number range, a GUID (e.g., a globally unique identifier), a hash, a look-up table, or the like.

When a short key 188 is implemented and a query for view object node keys is executed by system 100 (or key manager 180), key manager 180 will first determine the longer, determined keys 182 for the nodes. The longer keys 182 are then mapped 184 to the shorter keys 188, which are returned to the caller making the query. After the query-operation, in some cases a retrieve operation is executed (see, e.g., FIG. 5). To the retrieve (i.e., read) operation, the short key is passed. Internally (in the read operation), the short key is mapped to the long key. The long key includes all the information (e.g., keys of the source business object nodes) to execute the read operation. In some implementations, the longer key 182 may include all the information required to execute the call (e.g., a read, a change, a query, etc.). Depending on the runtime implementation, the mapping between long and short keys may be transient or persisted. When the runtime process does not stop during the query call and the read call, a transient mapping (e.g., in memory) is sufficient. If the runtime process stops between, for example, a query call and a read call, it may be necessary to persist the mapping 184 in a database.

Figure 5:
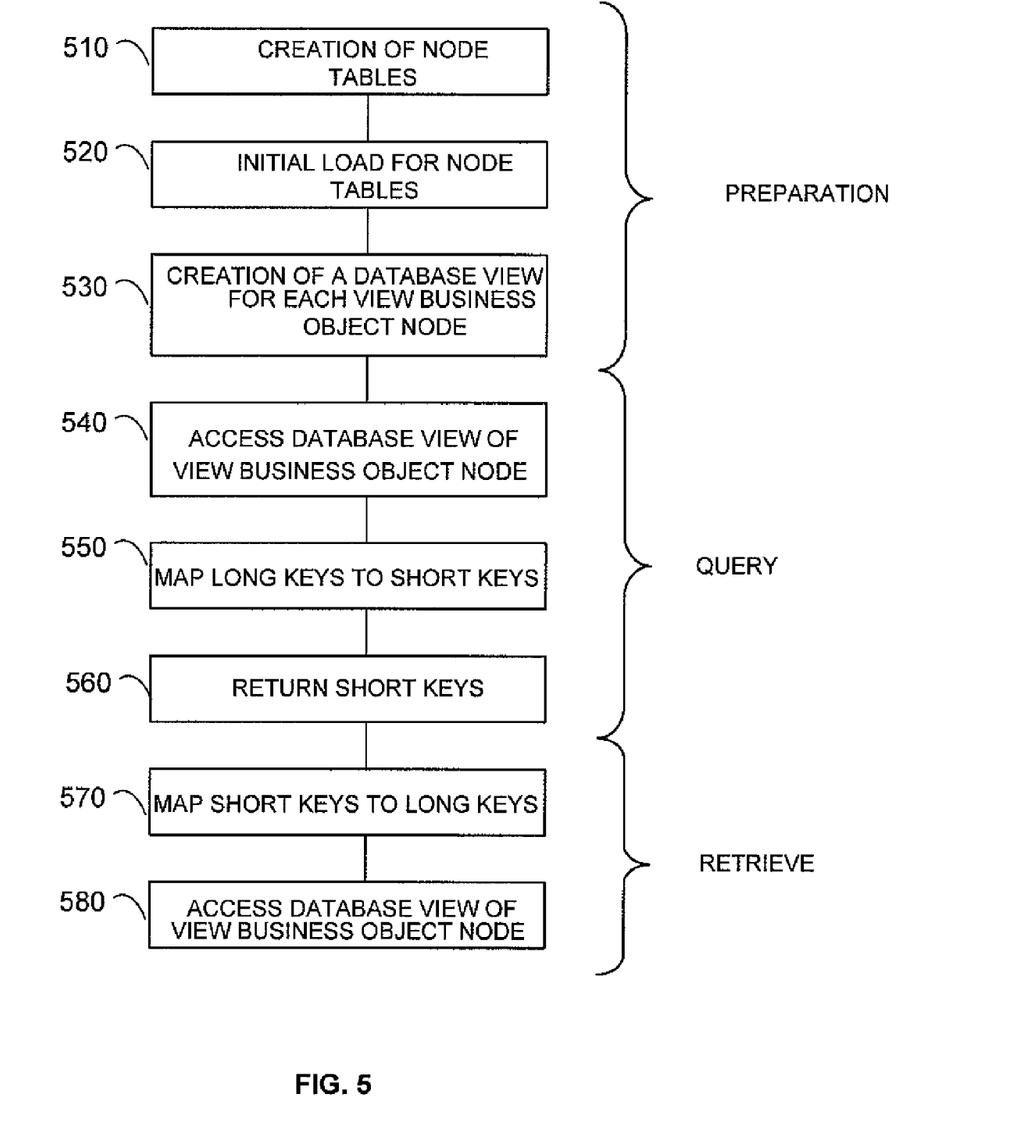
FIG. 5 depicts a runtime implementation using the determined key for view business object nodes.

FIG. 5 depicts a runtime implemenation using short keys mapped to long keys determined for the view business object nodes.

At 510, a database table (also referred to as a node table) is created for each business object node related to a transformation (e.g., a projection or a join) of a view business object node. The node table may include one or more of the following: the key of the business object node and any attributes of the business object node which may be mapped to an attribute of a view business object node; associations between business object nodes (e.g, composition, inner business object association, cross business object associations); and corresponding attributes including keys. A node table may store the foreign keys (e.g., attributes which hold the key of an associated node). Data in the node table may be loaded by an initial load process.

The node table also includes data (e.g., data for use in the business process), which may be loaded as an initial load process at 520. Any changes to the business object node may be reflected (or included) in the node table by an update mechanism, such as a periodic update, a trigger-based update for each change, and the like. The node table represents the business object node. Accessing the node table instead of calling operations (or methods) of the business object node may provide the benefit, in some cases, of enabling the use of specialized indices which can be defined for the node table allowing high performance access.

Instead of replacing all calls to original service operations by node table access, a runtime implementation may also work in a so-called "mixed" mode using the node table for performance critical operations (e.g., joins between node tables) and directing the remaining operations to the original service operations. The mixed mode may minimize the attributes included in the node table and thus reduce node table space as well as the time needed for the initial load. In the case when business object nodes are persisted, database tables may already be in use and those tables may be accessed (e.g., table content and definition), so that the original tables may be reused as node tables. However, in service oriented architecture (SOA), applications may not be allowed direct access to the persistency mechanism for business objects, so node tables may need to be used.

At 530, for each node of a view business object, a database view may be created. A database view is a so-called "virtual" dynamic table computed from other tables. The view is based on the node tables of the business object nodes. When creating a view business object, one or more of the following rules may be used to create the database views: a so-called "attribute rule" and a so-called "join rule," both of which are described below.

The "attribute rule" represents that for each key of a business object node (which is included in the transformation to a view business object node), a corresponding attribute is added to the view. The attribute is mapped to a key in the business object node table. The attributes of business objects nodes involved in the transformation (which may be relevant for the view node) are added to the view. Any join conditions of the transformation may be added to the view definition as well. Each join condition is translated into a join condition relating to attributes of the node tables. The relationships between business object nodes may be represented by corresponding foreign key relationships between node tables.

The "join rule" represents that a join condition to the view of the parent view business object node is added to the view. The keys of the parent view business object node are added to the view. The parent view business object node has a single key. However, this single key is a combination of many keys of the source business object nodes. At which point, the view may be considered to include a fully determined key. For joining, the composition relationship between view node and parent view node may be used. This relationship corresponds to a composition, inner business object association, cross business object association, or freestyle join condition between business object nodes. In all cases, the join can be expressed by join conditions relating to attributes of the corresponding node tables.

For the root view node (which has no parent), only the attribute rule is applied. At which point, a database view represents a view business object node.

At 540, a database view of a business object node may be accessed during a query. At 550, long keys may be mapped to short keys. At 560, the short key may be returned as part of the query. During a retrieve, the short key may be mapped to a long key at 570. At 560, the retrieve operation may use the short key to access a database view of a view business object node.

For fast access, the node table definitions are extended by adding secondary indices. The secondary indices include the attributes necessary for joining the business object nodes. Because the view for a view business object node includes the longer, determined key, a fast read access (by key of the virtual business object node) may be used. In some cases, fields may be added to be used in query requests to the secondary indices to enable fast query operations. The view created according to rules given above may include the longer, determined key rather than the shortened key described above. As a consequence, a mapping between the long and the shortened key may be required. However, the mapping may be performed using very fast with little (if any) performance degradation in the query.

Table 1 depicts the SQL commands to create the database view for a view business object node created by joining nodes A and B. In this example, the keys for the A and B nodes are included. The attribute REF_TO_D (representing the cross business object association) is included as an attribute.

TABLE 1

IMPLEMENATION EXAMPLE OF A VIEW

```
CREATE VIEW X AS
SELECT    A.KEY          AS A_KEY,
          B.KEY          AS B_KEY,
          A.REF_TO_D     AS REF_TO_D
FROM A,B
WHERE A.KEY = B.PARENT_KEY.
```

Table 2 below depicts the another view object node created by a projection of node D.

TABLE 2

IMPLEMENATION EXAMPLE OF ANOTHER VIEW

```
CREATE VIEW Y AS
SELECT    X.A_KEY    AS A_KEY,
          X.B_KEY    AS B_KEY,
          D.KEY      AS D_KEY
FROM X,D
WHERE X.REF_TO_D = D.KEY.
```

When a SELECT operation is performed for the view of Table 2 without any further selection conditions (given that there are only the object instances given in FIG. 2), the SELECT will lead exactly to the Y node instances A1, B2, D5 and A1, B3, D5.

Moreover, in some implementations, the determined keys of the view business object nodes maintain relationships to the source business object node keys from which the view business object nodes was transformed. By implementing a determined key maintaining relationship information to the source business object nodes, runtime implementations of the view business object nodes may provide enhanced read and query services.

In order to change a view business object node, the source business object nodes may need to be changed. A runtime implementation may determine the keys of the source (or original) business object nodes from the determined key and call change operations for the source business object nodes. If a runtime implementation does not provide change operations for view business object nodes, then at least the user may perform the changes manually.

In some implementations, the determined key for the view business object node is syntactically compatible (e.g. field length restrictions, and the like) to the keys of the source, business object nodes.

Moreover, the subject matter described herein may enable a high performance access to view business object data.

Although FIG. 1 is described with respect to a client and server architecture, system 100 may also use any other architecture or framework. Moreover, although the above examples are described with respect to the business objects and keys depicted in FIGS. 1-3, any other business object, data structure, and key types may be used as well.

In some implementations, a view business object node has either no parent view business object node (in that case the view business object node is the root view business object node) or exactly one parent view business object node. The parent view business object node also has either no parent a parent view business object node. Each view business object node may be related (by a transformation) to 1 to many source business object nodes.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A computer-readable medium containing instructions to configure a processor to perform a method, the method comprising:

determining a first key of a view business object node of a view business object type generated by a transformation of data provided by a source business object type of each of a plurality of business object nodes to satisfy a business process, by combining one or more keys of the business object nodes used to form the view business object node, the first key used to identify the view business object node when the view business object node is a root node;

determining, when the view business object node has a parent node, a second key of the view business object node by combining the first key and at least one key of the parent node, the second key used to identify the view business object node; and storing at least one of the first key and the second key to identify the view business object node.

2. The computer readable medium of claim 1 further comprising:

determining whether the view business object node is a parent node, wherein the parent node is a view business object node rather than a business object node.

3. The computer readable medium of claim 1, wherein determining the first key further comprises:

determining the first key by adding the one or more keys of the business object nodes used to form the view business object node, the view business object node formed as a projection or a join of the business object nodes.

4. The computer readable medium of claim 1, wherein determining the first key further comprises:

determining the first key used to uniquely identify the view business object node, when the view business object node is a root node, wherein the root node is a view business object node rather than a business object node.

5. The computer readable medium of claim 1 further comprising:

using at least the first key or the second key as a short key; and accessing a database view of the view business object node during a query; and mapping a long key to the short key to enable the short key to be returned with the query.

6. The computer readable medium of claim 5 further comprising:

mapping the short key to the long key, when retrieving data from the database view of the view business object node;

returning the short key.

7. A computer-implemented method comprising:

determining a first key of a view business object node of a view business object type generated by a transformation of data provided by a source business object type of each of a plurality of business object nodes to satisfy a business process, by combining one or more keys of the business object nodes used to form the view business object node, the first key used to identify the view business object node when the view business object node is a root node;

determining, when the view business object node has a parent node, a second key of the view business object node by combining the first key and at least one key of the parent node, the second key used to identify the view business object node; and storing at least one of the first key and the second key to identify the view business object node.

8. The computer-implemented method of claim 7 further comprising:

determining whether the view business object node is a parent node, wherein the parent node is a view business object node rather than a business object node.

9. The computer-implemented method of claim 7, wherein determining the first key further comprises:

determining the first key by adding the one or more keys of the business object nodes used to form the view business object node, the view business object node formed as a projection or a join of the business object nodes.

10. The computer-implemented method of claim 7, wherein determining the first key further comprises:

determining the first key used to uniquely identify the view business object node, when the view business object node is a root node, wherein the root node is a view business object node rather than a business object node.

11. The computer-implemented method of claim 7 further comprising:

using at least the first key or the second key as a short key;

accessing a database view of the view business object node during a query; and mapping a long key to the short key to enable the short key to be returned with the query.

12. The computer-implemented method of claim 11 further comprising:

mapping the short key to the long key, when retrieving data from the database view of the view business object node; and returning the short key.

13. A system comprising:

one or more processors; and memory including code to configure the one or more processor to perform a method comprising:

determining a first key of a view business object node of a view business object type generated by a transformation of data provided by a source business object type of each of a plurality of business object nodes to satisfy a business process, by combining one or more keys of the business object nodes used to form the view business object node, the first key used to identify the view business object node when the view business object node is a root node;

determining, when the view business object node has a parent node, a second key of the view business object node by combining the first key and at least one key of the parent node, the second key used to identify the view business object node; and storing at least one of the first key and the second key to identify the view business object node.

14. The system of claim 13 further comprising:

determining whether the view business object node is a parent node, wherein the parent node is a view business object node rather than a business object node.

15. The system of claim 13, wherein determining the first key further comprises:

determining the first key by adding the one or more keys of the business object nodes used to form the view business object node, the view business object node formed as a projection or a join of the business object nodes.

16. The system of claim 13, wherein determining the first key further comprises:

determining the first key used to uniquely identify the view business object node, when the view business object node is a root node, wherein the root node is a view business object node rather than a business object node.

17. The system of claim 13 further comprising:

using at least the first key or the second key as a short key;

accessing a database view of the view business object node during a query; and mapping a long key to the short key to enable the short key to be returned with the query.

18. The system of claim 17 further comprising:

mapping the short key to the long key, when retrieving data from the database view of the view business object node; and returning the short key.

* * * * *